Figure 1:
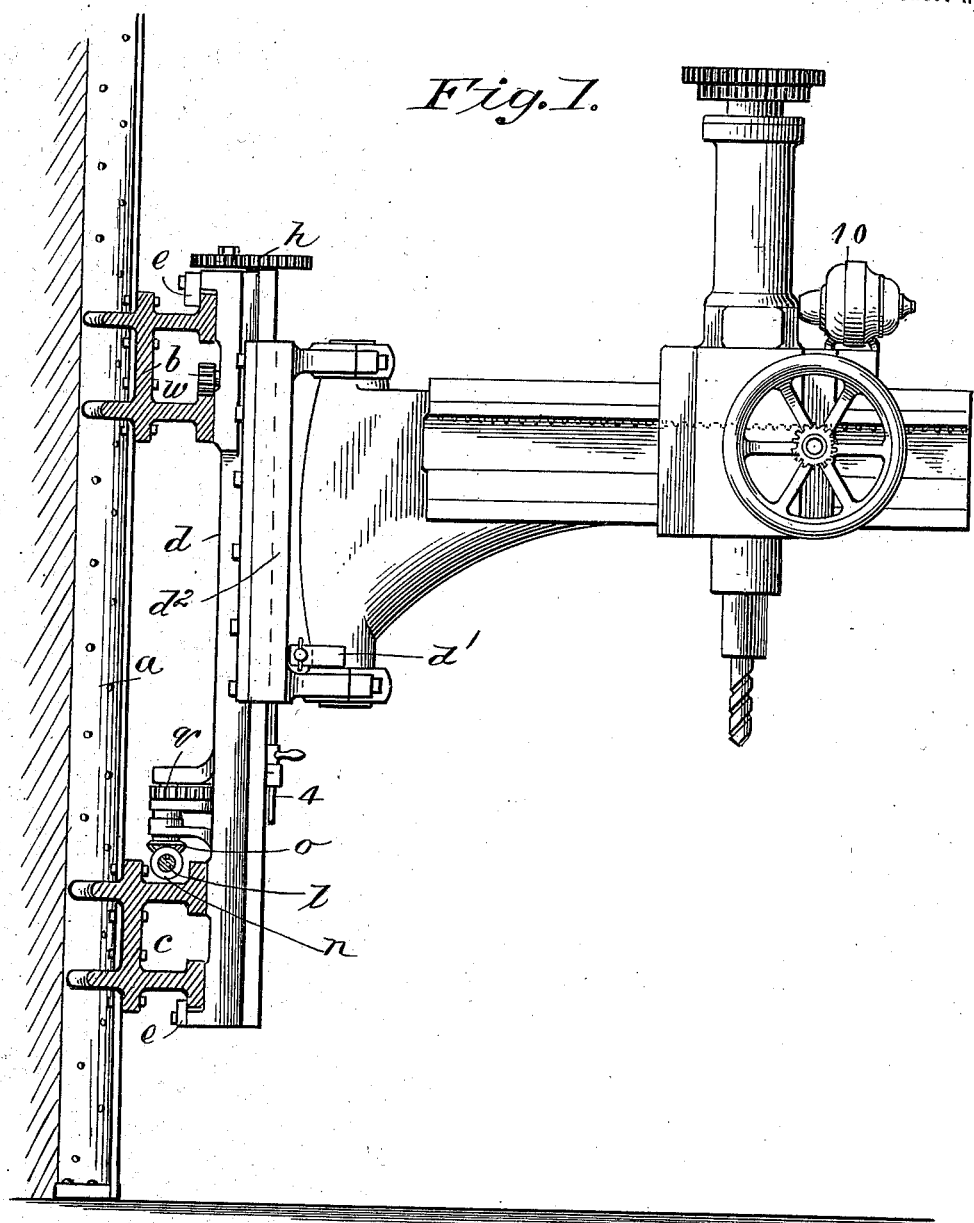

No. 709,253. Patented Sept. 16, 1902.
W. H. BAUSH.
MACHINE TOOL CONSTRUCTION.
(Application filed July 31, 1901.)
(No Model.) 5 Sheets—Sheet 1.

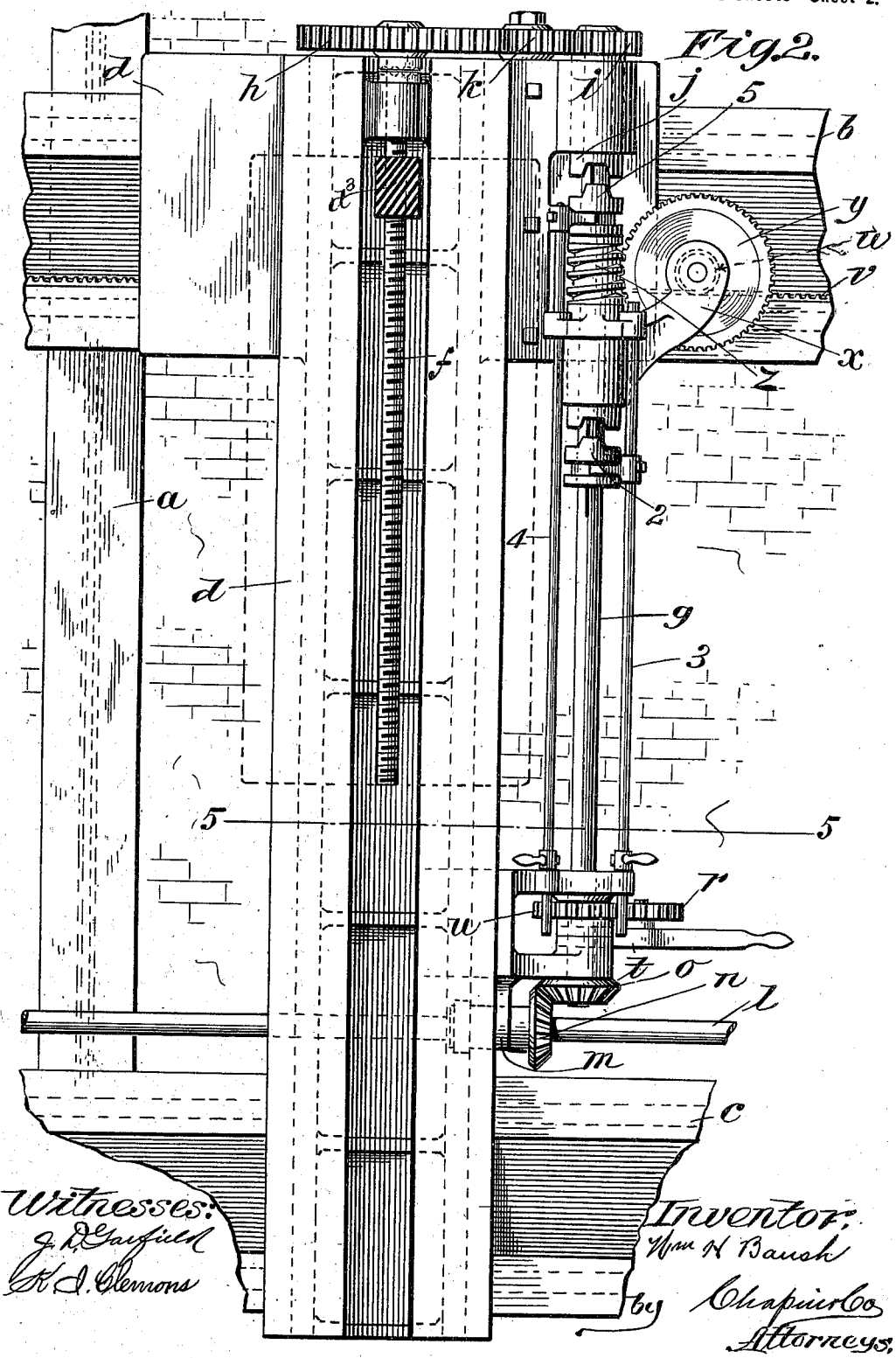

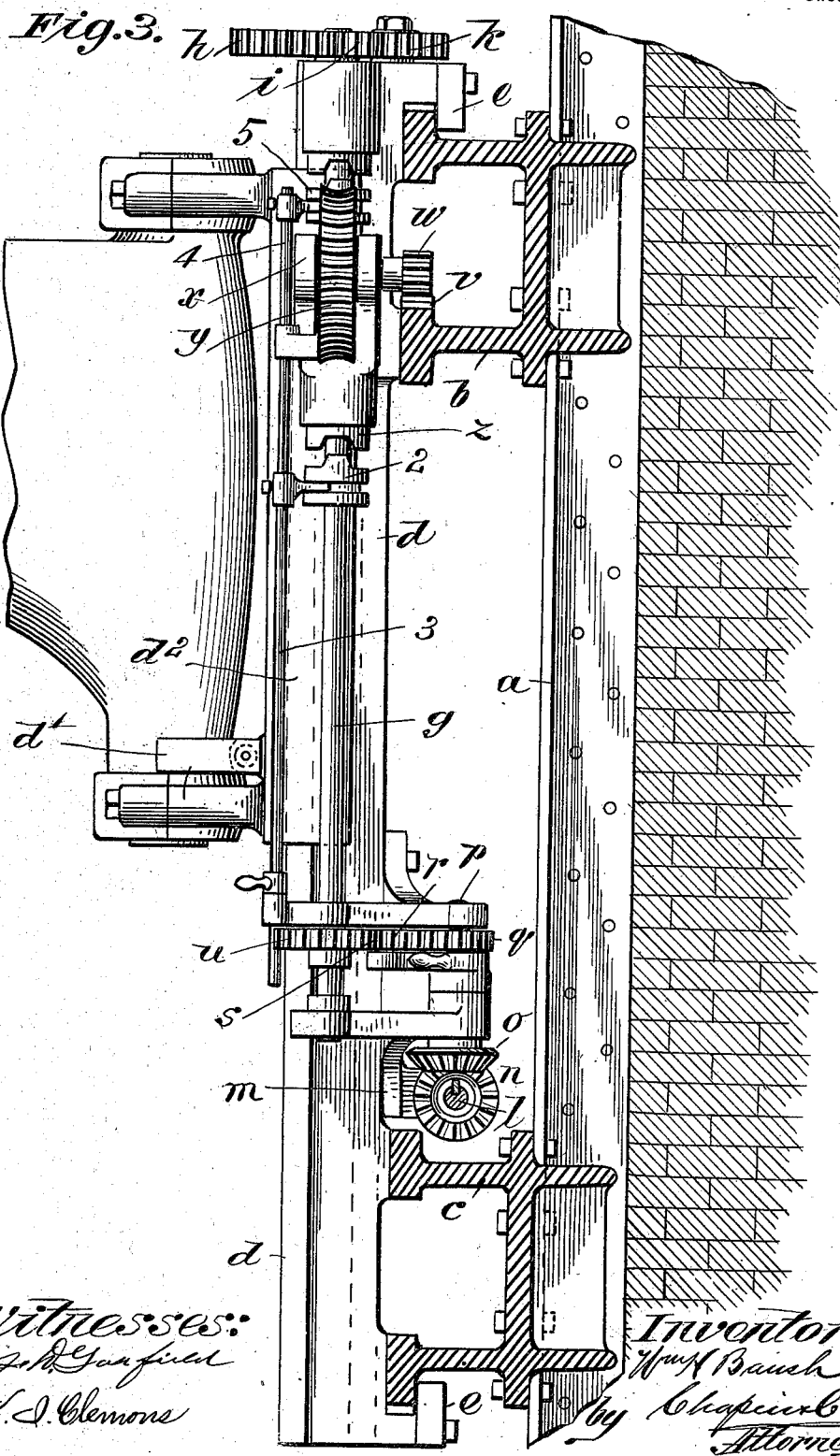

No. 709,253. Patented Sept. 16, 1902.
W. H. BAUSH.
MACHINE TOOL CONSTRUCTION.
(Application filed July 31, 1901.)
(No Model.) 5 Sheets—Sheet 4.
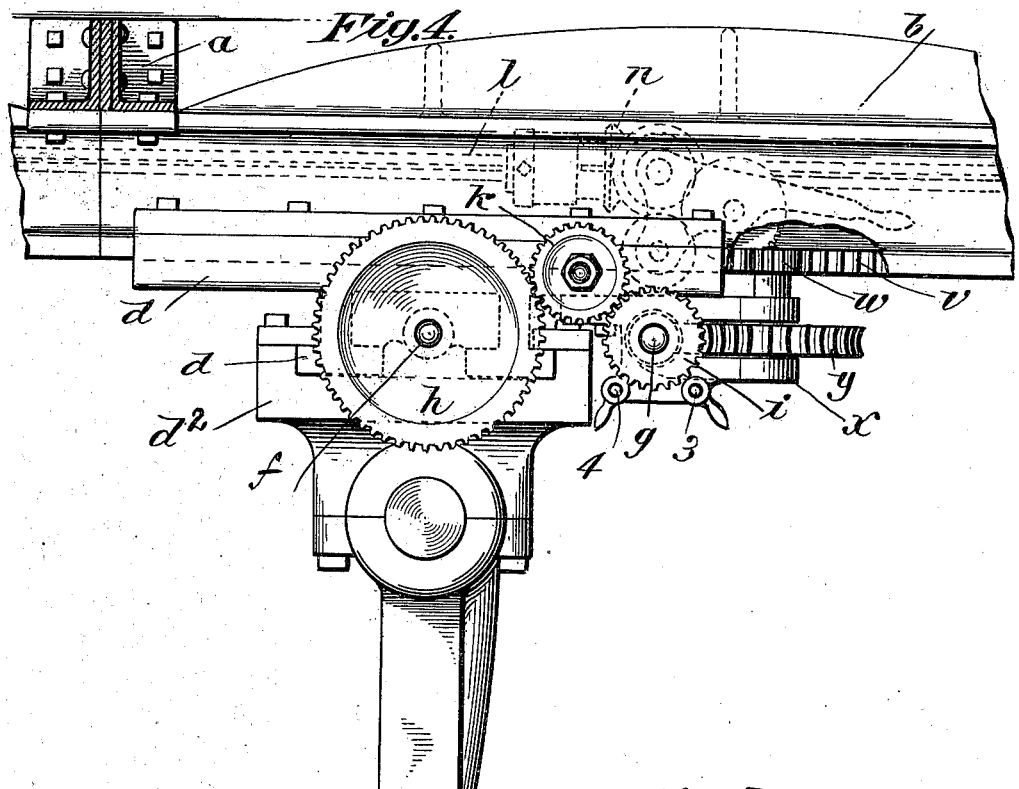
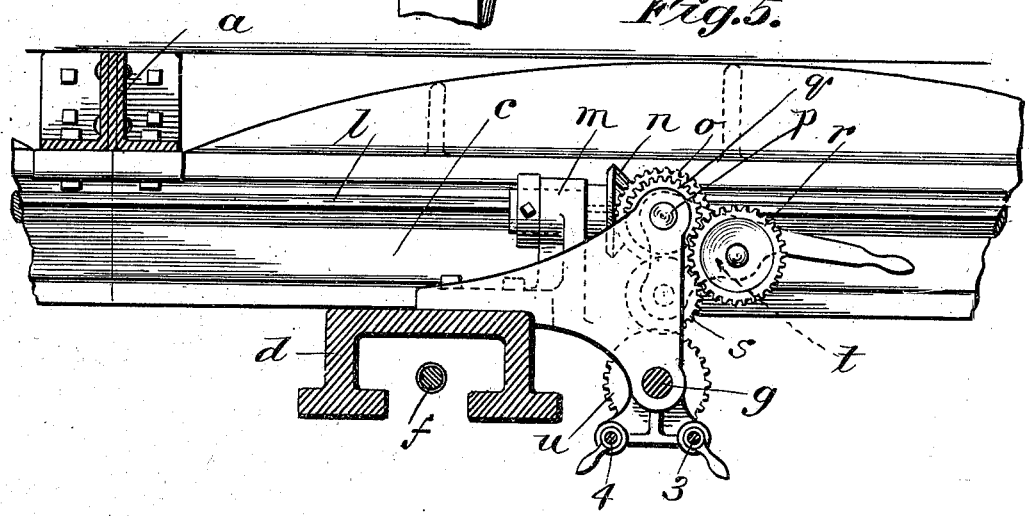
Witnesses:
Inventor,
Wm. H. Baush
by Chapin & Co.
Attorneys No. 709,253. Patented Sept. 16, 1902.
W. H. BAUSH.
MACHINE TOOL CONSTRUCTION.
(Application filed July 31, 1901.)
(No Model.) 5 Sheets—Sheet 5.

Witnesses:
Inventor
William H Baush
by Chapin & Lee
Attorneys.

UNITED STATES PATENT OFFICE.

WILLIAM H. BAUSH, OF SPRINGFIELD, MASSACHUSETTS.

MACHINE-TOOL CONSTRUCTION.

SPECIFICATION forming part of Letters Patent No. 709,253, dated September 16, 1902.

Application filed July 31, 1901. Serial No. 70,367. (No model.)

*To all whom it may concern:*

Be it known that I, WILLIAM HENRY BAUSH, a citizen of the United States of America, residing at Springfield, in the county of Hampden and State of Massachusetts, have invented new and useful Improvements in Machine-Tool Construction, of which the following is a specification.

This invention relates to machine-tool construction, and has for its object the production of means whereby a number of tools may be used simultaneously on a large piece of work, each tool being independently movable in horizontal and vertical lines in opposite directions by means common to all of them, said tools being supported on a common frame and each tool being provided with independent driving means. By means of this construction a number of radial drills, for example, may be employed on different parts of a large piece of work at the same time, whereby a great saving in the cost of performing said work may be effected, for the tools being independently movable one may be shifted at will without obliging the operator to wait for the completion of work being performed by some other tool.

The invention consists in the construction set forth in the following specification and clearly pointed out in the claims.

In the drawings a radial drill has been shown as the tool supported on the frame; but other tools may be supported in a similar manner, if desired. For example, a shaper may be carried on the frame and moved horizontally and vertically in the same manner as the drill shown.

Figure 6:
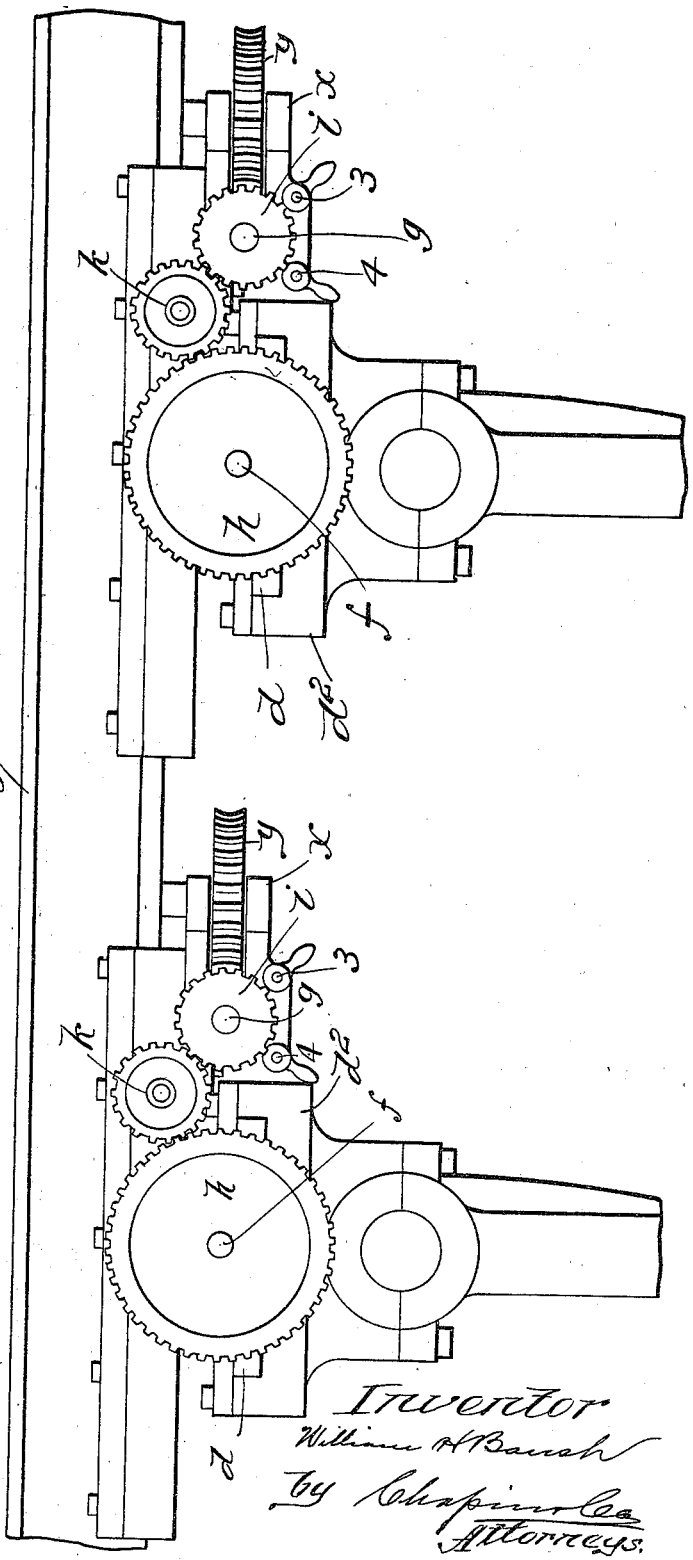

Figure 1 shows a radial drill supported on a frame, the drill being in side elevation and the frame in sectional elevation. Fig. 2 is an enlarged front elevation of a portion of the frame and the carriage on which a tool is supported and shows the controlling devices for the carriage. Fig. 3 is a side elevation of Fig. 2, showing in addition a part of an arm of a radial drill supported on the carriage. Fig. 4 is a plan view of Fig. 2. Fig. 5 is a sectional plan on line 5 5, Fig. 2. Fig. 6 is a top plan view of a portion of the bearing-rail and two of the tool-carrying frames mounted thereon.

In carrying my invention into practice I erect suitable posts $a$ along the wall of one side of the shop, to which posts are secured two horizontal parallel bearing-rails $b$ and $c$, which are secured to the posts $a$ in any suitable manner in position to support the upper and lower end of a tool-carrying frame $d$. The upper end of this frame, which slides on the rail $b$, is made broad enough to afford a steady bearing therefor, the lower end being connected with the rail $c$ for guiding purposes only. In Fig. 2 one of the frames $d$ is shown in front elevation and in dotted lines. There is also indicated on this figure the outline of a tool-carriage $d^2$, and there is also shown in this figure in section a nut or boss cast on the tool-carriage through which the feed-screw passes, whereby this carriage is moved vertically on the frame $d$. This will be referred to farther on. Suitable blocks $e$ at the upper and lower ends of the frame, securely screwed against the latter and overlapping the rails $b$ and $c$, retain the frame in its place on said rails. There may be as many of these frames as necessary to accommodate the number of tools it is desired to operate on one piece of work at one time. As stated, the frame shown in the drawings has the arm of a radial drill applied thereto; but other forms of tools may be supported thereon by making whatever local changes in the manner of securing the tool-carrying arm to the frame $d$ which may be required, whereby said tool may be operated in the same manner as the arm of the drill—that is to say, raised or lowered on the frame.

The frame $d$, as shown in Figs. 4 and 5, projects outwardly beyond the face of its broader upper end, which slides on the rail $b$ and is U-shaped in cross-section with flanged edges, whereby the usual sliding bearing for the supporting-arm of a tool may be provided.

When a radial drill-arm is supported on one of the frames $d$, it is desirable to provide some means, as a clamp $d'$, (shown in Fig. 3,) for locking the arm of the drill in any position to which it may be swung. This clamp consists of two arms partially encircling the arm and adapted to be screwed together to grasp the latter, said arms being supported on a lug on the carriage $d^2$, on which the arm is pivotally supported, all as clearly shown in Fig. 3. This raising and lowering of the tool is effected by means of a screw-shaft $f$, supported in the frame $d$ and having an engagement with a nut $d^3$ or suitably-threaded boss on the tool-carriage. This screw-shaft may be rotated to the right or left by a geared connection with a vertical shaft $g$, which is, in effect, a counter-shaft and which is operated in a manner to be described farther on, the gear connections between the screw-shaft $f$ and the said shaft $g$ consisting of a gear $h$ on said screw-shaft and a gear $i$, secured to a sleeve $j$, which may be locked to the shaft $g$ by a suitable clutch mechanism. The gears $h$ and $i$ have an intermediate gear $k$, whereby proper movements are imparted to the screw-shaft $f$.

Each of the frames $d$ is independently movable on its supporting-rail by means of a driving connection which may be established with a continuously-rotating shaft $l$. This shaft is parallel with the supporting-rails and extends from end to end thereof and is supported at each of the frames $d$ in a bearing $m$, which is clearly shown in Figs. 2, 3, and 5. The shaft in this bearing passes axially through the long hub of a beveled gear $n$, which has a spline-and-groove connection with the shaft $l$, and which gear meshes with another beveled gear $o$ on a short shaft $p$, (shown in Figs. 4 and 5 particularly,) and this shaft, rigidly supported in suitable bearings, is provided at its upper end with a gear $q$, which meshes with a gear $r$, the latter in turn being in mesh with a smaller gear $s$. The last two gears $r$ and $s$ are supported on studs on a swinging plate $t$, which is pivoted on the shaft $p$, the peripheries of both gears being equidistant from the axis on which the frame swings—that is, the shaft $p$. On the lower end of the vertical shaft $g$ there is secured a gear $u$. By means of a suitable handle on the plate $t$ the latter may be swung to bring either the gear $s$ into mesh with the gear $u$ or the gear $r$ into mesh therewith, to the end that the shaft $g$ may be driven in either direction. The plate $t$ may be swung in one direction, so that the gear $s$ will clear the gear $u$ entirely, whereby the shaft $g$ may be stopped. The two beveled gears $n$ and $o$ and the gears connected with the driving mechanism for the shaft $g$ are always rotating.

Means are provided for moving the frame $d$ on its supporting-rail by means of a toothed rack $v$, located, preferably, on the upper rail $b$, with which there is a pinion $w$ in mesh, which is fixed on a shaft rotatable in supports $x$, between which said shaft-supports is a worm-gear $y$, with which a worm $z$ engages, which worm rotates loosely on the shaft $g$, but which is adapted to be locked thereto by means of a sliding clutch 2 on the shaft $g$. This clutch is operated by a vertical shipper-rod 3, on which is a suitable fork engaging the clutch member. Above the worm $z$ there is another clutch member on the shaft $g$, operated by a vertical shipper-rod 4, the upper clutch being indicated by 5 and is adapted to interlock with the lower end of the sleeves $j$, which carries the gear $i$, whereby the screw-shaft $f$ is rotated through the gears $k$ and $h$.

By means of the above clutch connections between the shaft $g$ and the other parts it will be readily seen how the frame $d$ may be moved as desired and the tool-carriage supported thereon raised or lowered through the manipulation of the described driving connections. For example, if it is desired to move the frame $d$, carrying with it whatever tool may be at the time supported thereon, the shaft carrying the worm-gear $y$ must be rotated, and to effect this the handle on the frame $d$ is grasped and the latter is swung, for instance, to bring the gear $s$ into mesh with the gear $u$, as shown in Fig. 5 of the drawings, and the shipper-rod 3 is then raised, clutching the sleeve on which the worm $z$ is secured, and thereby rotating through the worm-gear $y$ the pinion $w$ in engagement with the rack $v$, which will cause the frame $d$ to travel in one direction. By bringing the gear $r$ into mesh with the gear $u$ the direction of movement of the frame $d$ may be reversed. By dropping the clutch 2 the shaft $g$ will continue to rotate idly, the frame being stationary. If now the shipper-rod 4 be operated to throw the clutch 5 into engagement with the sleeve on which the gear $i$ is supported, then through the gears $k$ and $h$ the screw-shaft $f$ may be rotated, and by the manipulation of the plate $t$ the arm of the tool with which the shaft engages may be raised and lowered at will. During this raising and lowering operation the clutch 2 may be thrown into gear and the frame $d$ moved on its supporting-rail.

Preferably whatever tool may be supported on the frame $d$ is provided with an independent driving mechanism—as, for example, an electric motor 10, as shown in Fig. 1—though this of course is a feature entirely independent of the present invention.

By means of this invention it has been demonstrated that a great saving may be made in the construction of large pieces of work, such as structural metal beams, ships' plates, and all heavy work.

Having thus described my invention, what I claim, and desire to secure by Letters Patent of the United States, is—

1. The combination with a bearing-rail, of a plurality of tool-carrying frames independently slidable on said rail, one driving-shaft common to all of said frames; a bearing for said shaft in each of said frames; a gear having a spline-and-groove connection with the driving-shaft, means for rotatably supporting said gear on the frame and constituting the bearing for the driving-shaft; means for sliding said frames on the bearing-rail, and a connection between the frame-sliding means and the gear on the driving-shaft, whereby said frame-sliding means may move said frames in opposite directions on the bearing-rail.

2. The combination with a bearing-rail, of a plurality of tool-carrying frames slidable on said rail independently one of the other, one driving member common to all of said frames, a gear on said member slidable thereon and rotatable therewith and a support on the frame for said gear; a rack on said bearing-rail, pinions on said frames, and means of connection between said pinions and the gear on said driving member whereby the pinions may be rotated to move the frames in opposite directions on the bearing-rail.

3. The combination with a bearing-rail, of a tool-carrying frame slidable horizontally thereon, a driving member for said frame, a counter-shaft supported on the frame, a tool-carriage on the frame movable vertically thereon, and means for imparting movements thereto, a clutch on said counter-shaft constituting a driving connection between said counter-shaft and the carriage-moving means; devices for moving said frame, and a second clutch on the counter-shaft constituting a driving connection between the counter-shaft and said frame-moving devices, whereby the frame and the tool may be operated separately or together, substantially as described.

4. The combination with a bearing-rail, of a tool-carrying frame slidable horizontally thereon, and means for moving said frame; a driving member for said frame, a counter-shaft supported on the frame, a driving connection between the frame-moving means and said counter-shaft, and a driving connection between said shaft and the driving member whereby said shaft may be either disconnected therefrom or rotated in either direction, substantially as described.

5. The combination with a bearing-rail, of a tool-carrying frame located transversely of said rail, and slidable horizontally thereon, means for moving said frame, a driving member for said frame, a clutch connection between said driving member and said frame-moving means, a tool-carriage supported, and vertically movable on, said frame, and a tool adapted to swing in a horizontal plane mounted on said carriage.

6. Two parallel rails, a plurality of frames supported on said rails transversely thereof, and means for sliding said frames on the rails independently in either direction; carriages on said frames having tools thereon adapted to swing in horizontal planes, and means for moving the carriages vertically; a driving member parallel with said rails and common to all of the frames, a counter-shaft on the frame, and independent means of connection between said shaft and the carriage-moving means, said shaft and the frame-moving means, and said shaft and the driving member, substantially as described.

WILLIAM H. BAUSH.

Witnesses:
Wm. H. Chapin,
K. I. Clemons.